US011431741B1

(12) United States Patent
Lin et al.

(10) Patent No.: US 11,431,741 B1
(45) Date of Patent: Aug. 30, 2022

(54) DETECTING UNMANAGED AND UNAUTHORIZED ASSETS IN AN INFORMATION TECHNOLOGY NETWORK WITH A RECURRENT NEURAL NETWORK THAT IDENTIFIES ANOMALOUSLY-NAMED ASSETS

(71) Applicant: Exabeam, Inc., San Mateo, CA (US)

(72) Inventors: Derek Lin, San Mateo, CA (US); Domingo Mihovilovic, Menlo Park, CA (US); Sylvain Gil, San Francisco, CA (US); Barry Steiman, San Ramon, CA (US)

(73) Assignee: Exabeam, Inc., Foster City, CA (US)

( * ) Notice: Subject to any disclaimer, the term of this patent is extended or adjusted under 35 U.S.C. 154(b) by 670 days.

(21) Appl. No.: 16/410,181

(22) Filed: May 13, 2019

Related U.S. Application Data

(60) Provisional application No. 62/672,379, filed on May 16, 2018.

(51) Int. Cl.
*H04L 9/40* (2022.01)
*G06N 3/08* (2006.01)

(52) U.S. Cl.
CPC ........... *H04L 63/1425* (2013.01); *G06N 3/08* (2013.01)

(58) Field of Classification Search
CPC ........ H04L 63/1425; H04L 63/14; G06N 3/08
USPC ...................................................... 726/22–25
See application file for complete search history.

(56) References Cited

U.S. PATENT DOCUMENTS

| | | | |
|---|---|---|---|
| 5,941,947 A | 8/1999 | Brown et al. | |
| 6,223,985 B1 | 5/2001 | DeLude | |
| 6,594,481 B1 | 7/2003 | Johnson et al. | |
| 7,181,768 B1 * | 2/2007 | Ghosh | H04L 63/1408 726/23 |
| 7,624,277 B1 * | 11/2009 | Simard | H04L 63/14 704/270 |
| 7,668,776 B1 | 2/2010 | Ahles | |

(Continued)

OTHER PUBLICATIONS

Adrian Taylor et al., Anomaly Detection in Automobile Control Network Data with Long Short-Term Memory Networks, IEEE (Year: 2016).*

(Continued)

*Primary Examiner* — Kambiz Zand
*Assistant Examiner* — Mahabub S Ahmed
(74) *Attorney, Agent, or Firm* — Lessani Law Group, PC

(57) ABSTRACT

The present disclosure describes a system, method, and computer program for detecting unmanaged and unauthorized assets on an IT network by identifying anomalously-named assets. A recurrent neural network (RNN) is trained to identify patterns in asset names in a network. The RNN learns the character distribution patterns of the names of all observed assets in the training data, effectively capturing the hidden naming structures followed by a majority of assets on the network. The RNN is then used to identify assets with names that deviate from the hidden naming structures. Specifically, the RNN is used to measure the reconstruction errors of input asset name strings. Asset names with high reconstruction errors are anomalous since they cannot be explained by learned naming structures. After filtering for attributes or circumstances that mitigate risk, such assets are associated with a higher cybersecurity risk.

17 Claims, 5 Drawing Sheets

(56) References Cited

U.S. PATENT DOCUMENTS

| | | | |
|---|---|---|---|
| 8,326,788 B2 | 12/2012 | Allen et al. | |
| 8,443,443 B2 | 5/2013 | Nordstrom et al. | |
| 8,479,302 B1 | 7/2013 | Lin | |
| 8,484,230 B2 | 7/2013 | Harnett et al. | |
| 8,539,088 B2 | 9/2013 | Zheng | |
| 8,583,781 B2 | 11/2013 | Raleigh | |
| 8,606,913 B2 | 12/2013 | Lin | |
| 8,676,273 B1 | 3/2014 | Fujisake | |
| 8,850,570 B1* | 9/2014 | Ramzan | H04L 63/145 713/188 |
| 8,881,289 B2 | 11/2014 | Basavapatna et al. | |
| 9,055,093 B2 | 6/2015 | Borders | |
| 9,081,958 B2 | 7/2015 | Ramzan et al. | |
| 9,185,095 B1 | 11/2015 | Moritz et al. | |
| 9,189,623 B1 | 11/2015 | Lin et al. | |
| 9,202,052 B1 | 12/2015 | Fang et al. | |
| 9,680,938 B1 | 6/2017 | Gil et al. | |
| 9,690,938 B1* | 6/2017 | Saxe | G06N 20/00 |
| 9,692,765 B2 | 6/2017 | Choi et al. | |
| 9,760,240 B2 | 9/2017 | Maheshwari et al. | |
| 9,779,253 B2 | 10/2017 | Mahaffey et al. | |
| 9,798,883 B1 | 10/2017 | Gil et al. | |
| 9,843,596 B1 | 12/2017 | Averbuch et al. | |
| 9,898,604 B2 | 2/2018 | Fang et al. | |
| 10,063,582 B1 | 8/2018 | Feng et al. | |
| 10,095,871 B2 | 10/2018 | Gil et al. | |
| 10,178,108 B1 | 1/2019 | Lin et al. | |
| 10,354,015 B2* | 7/2019 | Kalchbrenner | G06F 40/58 |
| 10,397,272 B1* | 8/2019 | Bruss | G06F 21/568 |
| 10,419,470 B1 | 9/2019 | Segev et al. | |
| 10,445,311 B1 | 10/2019 | Saurabh et al. | |
| 10,467,631 B2 | 11/2019 | Dhurandhar et al. | |
| 10,474,828 B2 | 11/2019 | Gil et al. | |
| 10,496,815 B1 | 12/2019 | Steiman et al. | |
| 10,621,343 B1* | 4/2020 | Maciejak | G06F 21/56 |
| 10,645,109 B1 | 5/2020 | Lin et al. | |
| 10,685,293 B1* | 6/2020 | Heimann | G06N 20/00 |
| 10,803,183 B2 | 10/2020 | Gil et al. | |
| 10,819,724 B2* | 10/2020 | Amiri | G06N 3/0445 |
| 10,841,338 B1 | 11/2020 | Lin et al. | |
| 10,887,325 B1 | 1/2021 | Lin et al. | |
| 10,944,777 B2 | 3/2021 | Lin et al. | |
| 11,017,173 B1* | 5/2021 | Lu | G06N 20/00 |
| 11,080,483 B1* | 8/2021 | Islam | G06F 40/205 |
| 11,080,591 B2* | 8/2021 | van den Oord | G10L 13/086 |
| 11,140,167 B1 | 10/2021 | Lin et al. | |
| 2002/0107926 A1 | 8/2002 | Lee | |
| 2003/0147512 A1 | 8/2003 | Abburi | |
| 2004/0073569 A1 | 4/2004 | Knott et al. | |
| 2006/0090198 A1 | 4/2006 | Aaron | |
| 2007/0156771 A1 | 7/2007 | Hurley | |
| 2007/0282778 A1 | 12/2007 | Chan et al. | |
| 2008/0028467 A1 | 1/2008 | Kommareddy et al. | |
| 2008/0040802 A1 | 2/2008 | Pierson et al. | |
| 2008/0170690 A1 | 7/2008 | Tysowski | |
| 2008/0262990 A1* | 10/2008 | Kapoor | H04L 67/306 706/20 |
| 2008/0301780 A1 | 12/2008 | Ellison et al. | |
| 2009/0144095 A1 | 6/2009 | Shahi et al. | |
| 2009/0171752 A1 | 7/2009 | Galvin et al. | |
| 2009/0293121 A1 | 11/2009 | Bigus et al. | |
| 2010/0125911 A1 | 5/2010 | Bhaskaran | |
| 2010/0269175 A1 | 10/2010 | Stolfo et al. | |
| 2010/0284282 A1* | 11/2010 | Golic | H04L 63/1425 370/242 |
| 2011/0167495 A1* | 7/2011 | Antonakakis | H04L 63/1491 726/23 |
| 2012/0278021 A1 | 11/2012 | Lin et al. | |
| 2012/0316835 A1 | 12/2012 | Maeda et al. | |
| 2012/0316981 A1 | 12/2012 | Hoover et al. | |
| 2013/0080631 A1 | 3/2013 | Lin | |
| 2013/0117554 A1 | 5/2013 | Ylonen | |
| 2013/0197998 A1 | 8/2013 | Buhrmann et al. | |
| 2013/0227643 A1 | 8/2013 | Mccoog et al. | |
| 2013/0305357 A1 | 11/2013 | Ayyagari et al. | |
| 2013/0340028 A1 | 12/2013 | Rajagopal et al. | |
| 2014/0007238 A1* | 1/2014 | Magee | G06F 21/577 726/24 |
| 2014/0090058 A1* | 3/2014 | Ward | H04L 63/1433 726/23 |
| 2014/0101759 A1* | 4/2014 | Antonakakis | H04L 63/1491 726/22 |
| 2014/0315519 A1 | 10/2014 | Nielsen | |
| 2015/0026027 A1 | 1/2015 | Priess et al. | |
| 2015/0039543 A1* | 2/2015 | Athmanathan | H04L 63/1425 706/20 |
| 2015/0046969 A1 | 2/2015 | Abuelsaad et al. | |
| 2015/0121503 A1 | 4/2015 | Xiong | |
| 2015/0205944 A1 | 7/2015 | Turgeman | |
| 2015/0215325 A1* | 7/2015 | Ogawa | G06F 16/13 726/23 |
| 2015/0339477 A1 | 11/2015 | Abrams et al. | |
| 2015/0341379 A1 | 11/2015 | Lefebvre et al. | |
| 2015/0363691 A1* | 12/2015 | Gocek | G06N 3/02 706/16 |
| 2016/0005044 A1 | 1/2016 | Moss et al. | |
| 2016/0021117 A1 | 1/2016 | Harmon et al. | |
| 2016/0063397 A1 | 3/2016 | Ylipaavalniemi et al. | |
| 2016/0292592 A1 | 10/2016 | Patthak et al. | |
| 2016/0306965 A1 | 10/2016 | Iyer et al. | |
| 2016/0364427 A1 | 12/2016 | Wedgeworth, III | |
| 2017/0019506 A1 | 1/2017 | Lee et al. | |
| 2017/0024135 A1 | 1/2017 | Christodorescu et al. | |
| 2017/0127016 A1* | 5/2017 | Yu | G06V 10/82 |
| 2017/0155652 A1 | 6/2017 | Most et al. | |
| 2017/0161451 A1 | 6/2017 | Weinstein et al. | |
| 2017/0213025 A1 | 7/2017 | Srivastav et al. | |
| 2017/0236081 A1 | 8/2017 | Grady Smith et al. | |
| 2017/0264679 A1 | 9/2017 | Chen et al. | |
| 2017/0318034 A1 | 11/2017 | Holland et al. | |
| 2017/0323636 A1* | 11/2017 | Xiao | G06F 16/332 |
| 2018/0004961 A1 | 1/2018 | Gil et al. | |
| 2018/0048530 A1 | 2/2018 | Nikitaki et al. | |
| 2018/0063168 A1* | 3/2018 | Sofka | G06N 3/0454 |
| 2018/0069893 A1 | 3/2018 | Amit et al. | |
| 2018/0075343 A1* | 3/2018 | van den Oord | G06N 3/0454 |
| 2018/0089304 A1 | 3/2018 | Vizer et al. | |
| 2018/0097822 A1* | 4/2018 | Huang | G06N 20/00 |
| 2018/0144139 A1 | 5/2018 | Cheng et al. | |
| 2018/0157963 A1* | 6/2018 | Salti | G01S 19/14 |
| 2018/0165554 A1* | 6/2018 | Zhang | G06N 3/084 |
| 2018/0190280 A1* | 7/2018 | Cui | G10L 15/16 |
| 2018/0234443 A1 | 8/2018 | Wolkov et al. | |
| 2018/0248895 A1 | 8/2018 | Watson et al. | |
| 2018/0285340 A1* | 10/2018 | Murphy | G06F 16/93 |
| 2018/0288063 A1 | 10/2018 | Koottayi et al. | |
| 2018/0288086 A1* | 10/2018 | Amiri | G06N 3/08 |
| 2018/0307994 A1 | 10/2018 | Cheng et al. | |
| 2018/0322368 A1* | 11/2018 | Zhang | G06K 9/6256 |
| 2019/0014149 A1* | 1/2019 | Cleveland | H04L 9/3236 |
| 2019/0028496 A1* | 1/2019 | Fenoglio | H04L 63/1425 |
| 2019/0034641 A1 | 1/2019 | Gil et al. | |
| 2019/0066185 A1* | 2/2019 | More | G06F 40/284 |
| 2019/0080225 A1* | 3/2019 | Agarwal | G06N 5/04 |
| 2019/0089721 A1* | 3/2019 | Pereira | H04L 63/1425 |
| 2019/0103091 A1* | 4/2019 | Chen | G06F 40/279 |
| 2019/0114419 A1* | 4/2019 | Chistyakov | G06F 17/15 |
| 2019/0124045 A1 | 4/2019 | Zong et al. | |
| 2019/0132629 A1* | 5/2019 | Kendrick | G06F 16/9017 |
| 2019/0149565 A1* | 5/2019 | Hagi | G06N 5/022 726/23 |
| 2019/0171655 A1* | 6/2019 | Psota | G06F 16/2379 |
| 2019/0182280 A1* | 6/2019 | La Marca | H04L 43/16 |
| 2019/0205750 A1* | 7/2019 | Zheng | G06Q 30/0276 |
| 2019/0213247 A1 | 7/2019 | Pala et al. | |
| 2019/0244603 A1* | 8/2019 | Angkititrakul | G06N 3/0454 |
| 2019/0303703 A1* | 10/2019 | Kumar | G06N 3/08 |
| 2019/0318100 A1* | 10/2019 | Bhatia | G06F 21/554 |
| 2019/0334784 A1 | 10/2019 | Kvernvik et al. | |
| 2019/0349400 A1* | 11/2019 | Bruss | G06F 21/53 |
| 2019/0378051 A1* | 12/2019 | Widmann | G06N 3/0454 |
| 2020/0021607 A1 | 1/2020 | Muddu et al. | |
| 2020/0082098 A1 | 3/2020 | Gil et al. | |
| 2020/0228557 A1 | 7/2020 | Lin et al. | |

(56) References Cited

U.S. PATENT DOCUMENTS

| | | | |
|---|---|---|---|
| 2020/0302118 A1* | 9/2020 | Cheng | G06F 40/295 |
| 2020/0327886 A1* | 10/2020 | Shalaby | G10L 15/18 |
| 2021/0089884 A1* | 3/2021 | Macready | G06N 10/00 |
| 2021/0125050 A1* | 4/2021 | Wang | G06N 3/08 |
| 2021/0182612 A1* | 6/2021 | Zeng | G06V 10/82 |
| 2021/0232768 A1* | 7/2021 | Ling | G16B 50/10 |
| 2022/0006814 A1 | 1/2022 | Lin et al. | |

OTHER PUBLICATIONS

Jonathan Goh et al., Anomaly Detection in Cyber Physical Systems using Recurrent Neural Networks, IEEE (Year: 2017).*

Adrian Taylor, Anomaly-based detection of malicious activity in in-vehicle networks, Ph. D Thesis, University of Ottawa (Year: 2017).*

Alejandro Correa Bahnsen et al., Classifying Phishing URLs Using Recurrent Neural Networks, IEEE (Year: 2017).*

Jihyun Kim et al., Long Short Term Memory Recurrent Neural Network Classifier for Intrusion Detection, IEEE (Year: 2016).*

Shuhao Wang et al., Session-Based Fraud Detection in Online E-Commerce Transactions Using Recurrent Neural Networks, springer (Year: 2017).*

Ke Zhang et al., Automated IT System Failure Prediction: A Deep Learning Approach, IEEE (Year: 2016).*

Malik, Hassan, et al., "Automatic Training Data Cleaning for Text Classification", 11th IEEE International Conference an Data Mining Workshops, 2011, pp. 442-449.

Chen, Jinghui, et al., "Outlier Detection with Autoencoder Ensembles", Proceedings of the 2017 SIAM International Conference on Data Mining, pp. 90-98.

Ioannidis, Yannis, "The History of Histograms (abridged)", Proceedings of the 29th VLDB Conference (2003), pp. 1-12.

DatumBox Blog, "Machine Learning Tutorial: The Naïve Bayes Text Classifier", DatumBox Machine Learning Blog and Software Development News, Jan. 2014, pp. 1-11.

Freeman, David, et al., "Who are you? A Statistical Approach to Measuring User Authenticity", NDSS, Feb. 2016, pp. 1-15.

Wang, Alex Hai, "Don't Follow Me Spam Detection in Twitter", International Conference on Security and Cryptography, 2010, pp. 1-10.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

* cited by examiner

DETECTING UNMANAGED AND UNAUTHORIZED ASSETS IN AN INFORMATION TECHNOLOGY NETWORK WITH A RECURRENT NEURAL NETWORK THAT IDENTIFIES ANOMALOUSLY-NAMED ASSETS

RELATED APPLICATIONS

This application claims the benefit of U.S. Provisional Application No. 62/672,379 filed on May 16, 2018, and titled "Detecting Unmanaged and Unauthorized Devises on the Network with Long Short-Term Memory Network," the contents of which are incorporated by reference herein as if fully disclosed herein.

BACKGROUND OF THE INVENTION

1. Field of the Invention

This invention relates generally to security analytics in computer networks, and more specifically to detecting unmanaged and unauthorized assets in a computer network by using a recurrent neural network to identify anomalously-named assets.

2. Description of the Background Art

Devices unknown to corporate information technology (IT) teams pose security threats. Whether they are legitimate, but unmanaged devices, or unauthorized rogue devices, they represent a security blind spot, as they are potential entry points for malware or adversarial actions. In 2016, the world discovered the Mirai Botnet, which targeted Internet-of-Things (IoT) devices that are generally not managed by businesses. The rapid growth of bring-your-own-device (BYOD) initiatives invites security risks as employees, contractors, and partners bring unvetted devices to corporate networks. Unknown devices are not limited to the physical hardware of users' laptops or employees' smartphones. With compromised accounts, adversaries can create unmonitored virtual machine (VM) at will for malicious purposes and delete the VMs afterwards to hide their tracks. These devices present an attack surface from multiple points. The risks are comprised intellectual property, leaked sensitive data, and a tarnished company reputation.

Current approaches in device management range from deployment of mobile device management (MDM) tools to cloud access security broker (CASB) enforcement. Nonetheless, these solutions are costly and require administration as well as compliance. And they do not address devices brought in by nonemployees or virtual machines created and used in a malicious way. Reducing the security risk from unknown physical or virtual devices is multifaceted. A key first step toward reducing risk from unknown devices is to recognize and identify their presence.

In a large corporate network, managed devices adhere to some official naming conventions. In practice, groups of unmanaged devices may have their own unofficial naming conventions that are unknown to the IT department. Some such groups belong to internal departments outside of formal control policy; some are from legacy systems or domains; some belong to external vendors or partners; and some are communication devices brought in by employees. Outside of these, unmanaged or unauthorized device with arbitrary names without naming peers are the most interesting, as they are anomalous. An example is a freely-named VM created via compromised credentials.

There is demand for a system that can detect anomalously-named devices on a network. Such a system can be part of a comprehensive risk detection system. Known industry solutions rely on policies to manage controlled devices. We are unaware of any prior work that investigates the presence of unknown devices from device name only.

SUMMARY OF THE DISCLOSURE

The present disclosure describes a system, method, and computer program for detecting unmanaged and unauthorized assets on an IT network by identifying anomalously-named assets. A recurrent neural network (RNN), such as a long short-term network (LSTM) or bidirectional RNN, is trained to identify patterns in asset names in a network. The RNN learns the character distribution patterns of the names of all observed assets in the training data, effectively capturing the hidden naming structures followed by a majority of assets on the network. The RNN is then used to identify and flag assets with names that deviate from the hidden asset naming structures. Specifically, the RNN is used to measure the reconstruction errors of input asset name strings. Asset names with high reconstruction errors are anomalous since they cannot be explained by learned naming structures. These identified assets make up an initial pool of potentially unmanaged and unauthorized assets.

In certain embodiments, the initial pool is then filtered to remove assets with attributes that mitigate the cybersecurity risk associated with them. For example, the filtering may remove assets who names may deviate from network-wide naming conventions, but are consistent with naming conventions in their peer group.

The assets in the pool that remain after filtering are associated with a higher cybersecurity risk, as these assets are likely unmanaged and unauthorized assets. In certain embodiments, this means that these assets are presented in a user interface for administrative review. In addition or alternatively, in a system that computes a cybersecurity risk score for user sessions, the presence of these assets for the first time in a user session elevates the risk score for the session.

In one embodiment, a method for detecting anomalously-named assets comprises the following:
  creating a set of input vectors representative of an asset name in the IT network, each vector in the set corresponding to a character in the asset name;
  applying the set of input vectors to a recurrent neural network comprising an encoder and a decoder, wherein the recurrent neural network is trained to identify patterns in asset names in the IT network;
  using the encoder to compress the set of input vectors to a single latent vector that is representative of the asset name and that is generated based on patterns in asset names in the IT network learned by the recurrent neural network during training;
  applying the latent vector to the decoder as an initial state of the decoder to reconstruct the asset name one character at a time;
  receiving the reconstructed asset name;
  determining a degree of reconstruction error between the reconstructed asset name and the asset name;
  determining whether the degree of reconstruction error is above a threshold; and in response to determining that the degree of reconstruction error is above a threshold, flagging the asset name as being anomalous.

DETAILED DESCRIPTION OF THE PREFERRED EMBODIMENTS

The present disclosure describes a system, method, and computer program for detecting unmanaged and unauthorized assets on an IT network by identifying anomalously-named assets. Examples of assets are virtual machines and physical devices, such as computers, printers, and smart phones. The method is performed by a computer system (the "system"), such as a computer system that detects cyber threats in a network. The system may be a user behavior analytics (UBA) system or a user-and-entity behavior analytics system (UEBA). An example of a UBA/UEBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

1. Identify Assets with Anomalous Names

Figure 1A:
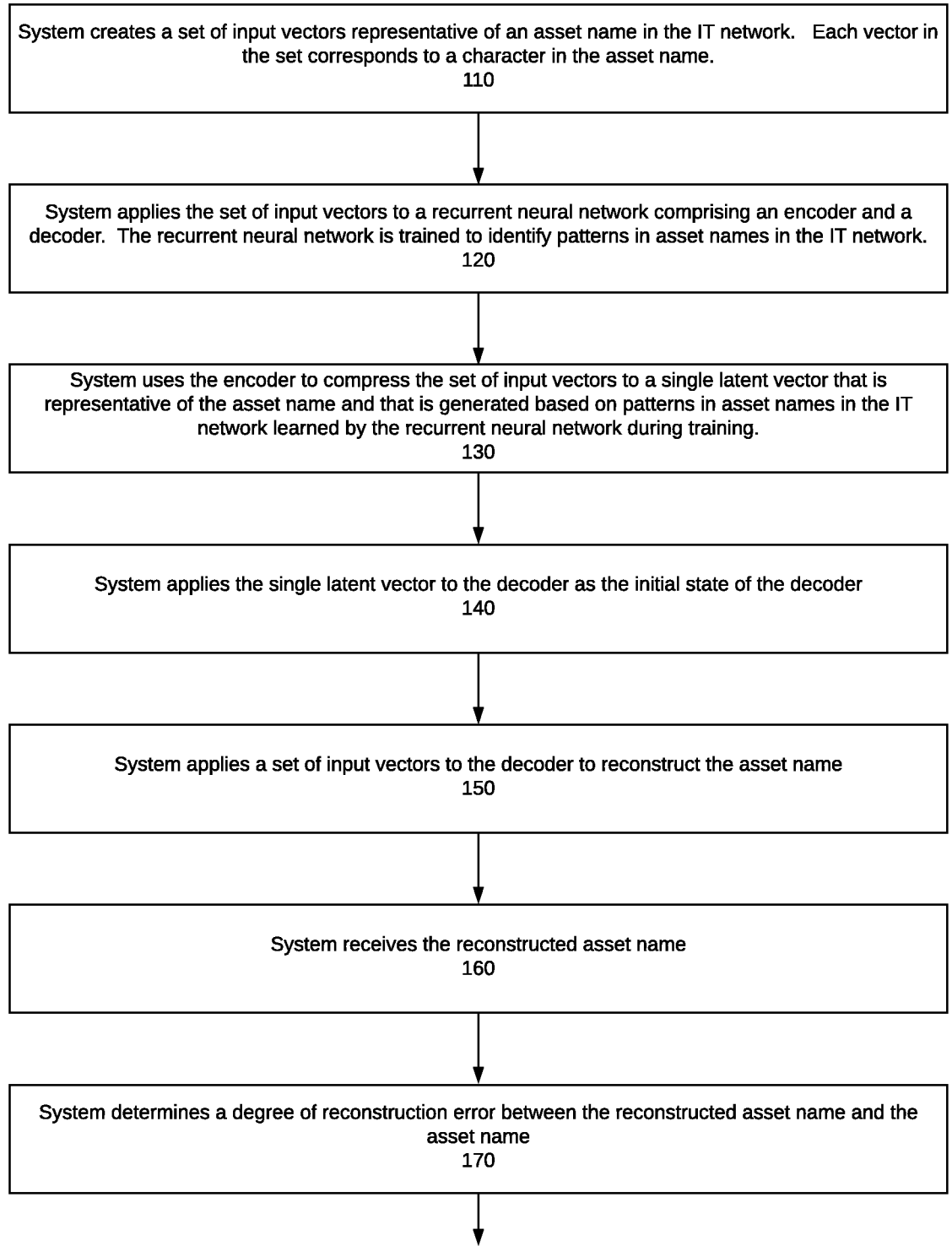
FIGS. 1A-1B are flowcharts that illustrates a method, according to one embodiment, for detecting anomalous asset names in an IT network.
Figure 1B:
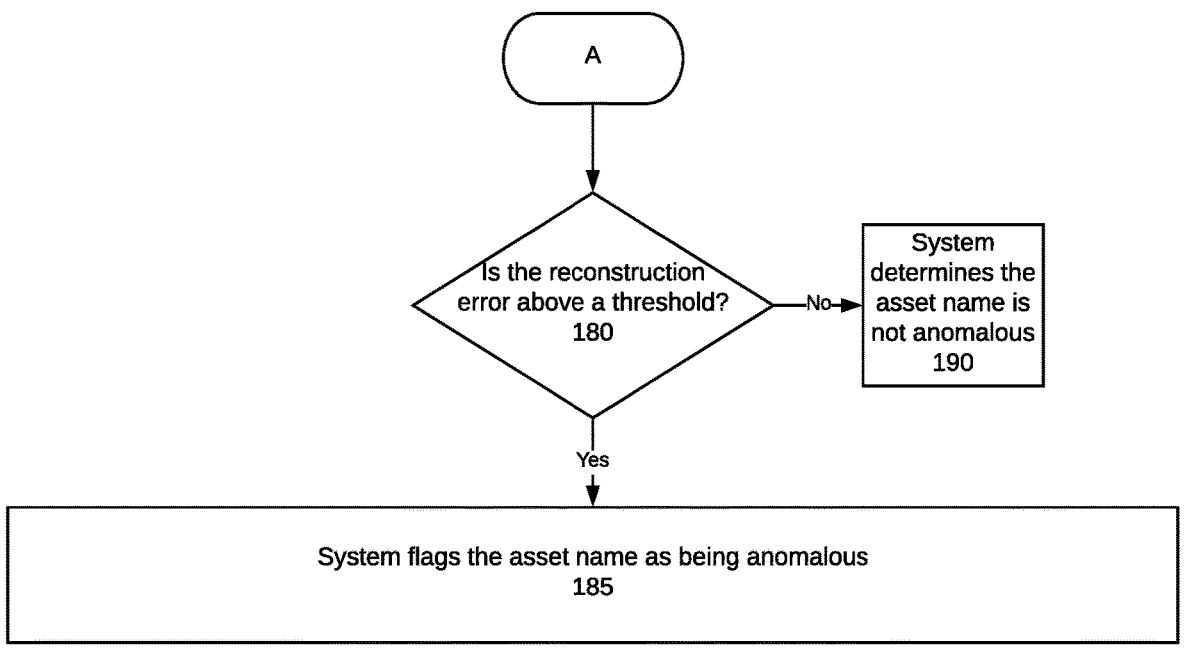

FIGS. 1A-1B illustrate a method for detecting anomalous asset names in an IT network. Although the method is described with respect to a single asset, it is performed for each of a plurality of assets in the network (e.g., all assets). The system creates a set of input vectors representative of an asset name (step 110). The asset name is treated as a sequence of characters, and each vector in the set corresponds to a character in the asset name. In one embodiment, each character is represented by a numerical value, and each character is converted to a numerical value using one-hot encoding.

The system applies the set of input vectors to an RNN that has been trained to identify patterns in asset names in the IT network (step 120). As described below, during training the RNN learns the character distribution patterns of the names of all observed assets in the training data, effectively capturing the hidden naming structures followed by a majority of assets on the network.

The RNN comprises an encoder and a decoder. The system uses the RNN encoder to compress the set of input vectors into a single latent vector that is representative of the asset name and that is generated based on patterns in asset names in the IT network learned by the RNN during training (step 130). The system then uses the decoder, the single latent vector, and the set of input vectors to reconstruct the asset name. Specifically, the decoder receives the single latent vector output of the encoder as its initial state (step 140) With the state initialized by the single latent vector, the set of input vectors is then applied to the decoder to reconstruct the asset name (step 150).

In one embodiment, the RNN is a seq2seq long short-term memory network (LSTM), and the asset name is reconstructed one character at a time with teacher forcing method in which the set of input vectors, offset by one time step, is applied to the LSTM decoder. In other words, the LSTM decoder predicts a character at time t given a character at time t−1 and the state of the LSTM decoder at time t. In an alternate embodiment, the RNN is a bidirectional recurrent neural network.

The system receives the reconstructed asset name from the decoder and determines a degree of reconstruction error between the reconstructed asset name and the original asset name (steps 160, 170). The system ascertains whether the reconstruction error is above a threshold (e.g., top 1% largest error) (step 180). If the reconstruction error is above the threshold, the asset is flagged as anomalous (step 185). Otherwise, the system concludes that the asset name is not anomalous (190). In one embodiment, the system computes the categorical cross-entropy loss values of the asset name character sequences, and flags the top r percent (e.g., top 1%) of asset names with the largest loss as the initial candidates of anomalous asset names to review.

Figure 2:
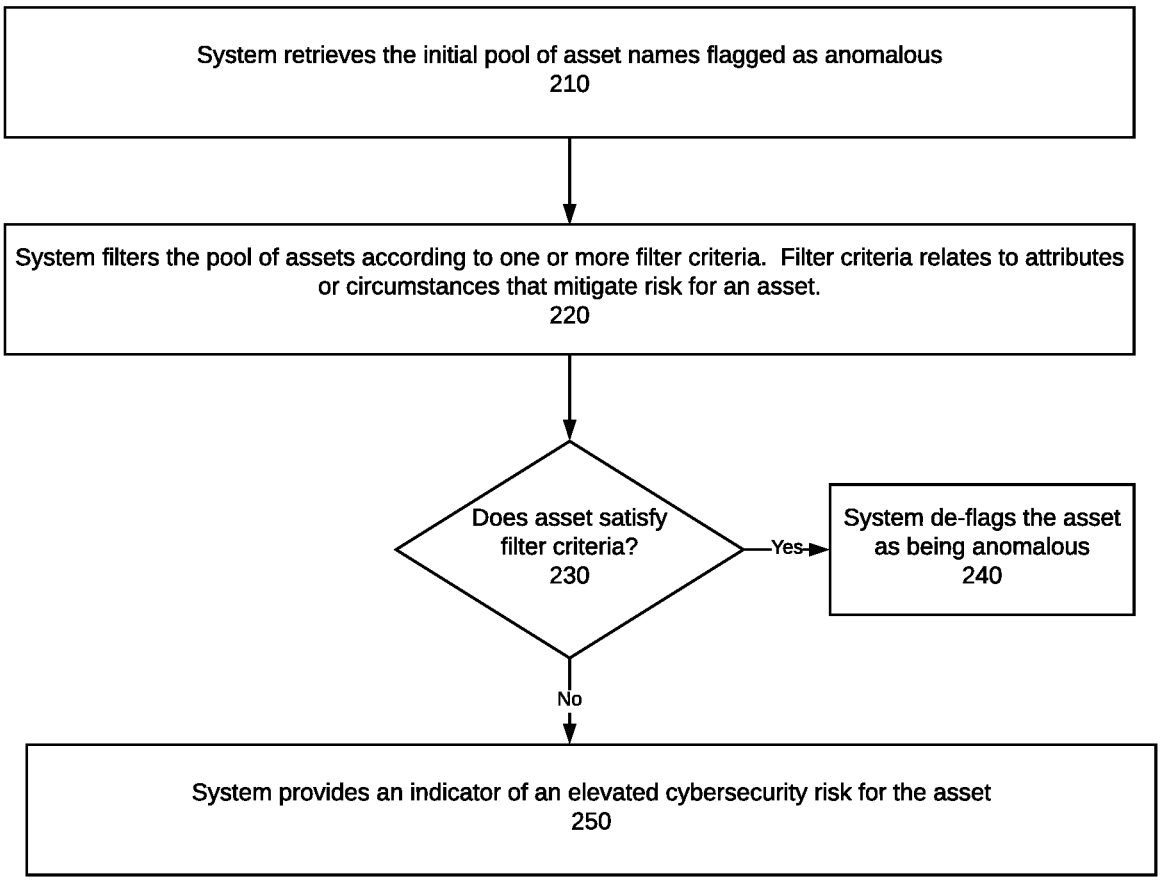
FIG. 2 is a flowchart that illustrates a method, according to one embodiment, for providing an indication of an elevated cybersecurity risk for certain anomalously-named assets.

2. Filtering Assets Flagged as Anomalous and Associating Elevated Risk with Anomalously-Named Assets that Pass Filtering As illustrated in FIG. 2, in certain embodiments, the system takes the initial pool of asset with names flagged as anomalous and filters the pool to remove assets that are less likely to be unmanaged and unauthorized assets (steps 210, 220). For example, the system may remove assets that may have anomalous names when looked at the network in whole, but not when compared to the asset's peer group (i.e. the assets names are anomalous from a global network-wide perspective, but not from a local peer group perspective). Also, the system may filter out assets used by multiple users, as an asset used by a single user is deemed to be riskier than others that are accessed by multiple users.

Assets that satisfy the filter criteria are de-flagged as being anomalous (step 230, 240). The system provides an indicator of an elevated cybersecurity risk for anomalously-named assets that pass through the filter criteria, as these assets are likely to be unmanaged and unauthorized assets (step 230, 250). For example, these assets may be presented in a user interface for administrative review. The displayed assets may be ranked based on reconstruction error (i.e., the higher the reconstruction error, the higher the rank). In addition or alternatively, whether an asset has an anomalous name may be used by a UBA/UBEA as input to a risk rule. Anomalously-named assets that pass the filter criteria may trigger a risk rule, resulting in a higher risk score for the applicable user or asset session. For example, the system may add points to a user session risk score if it is the first time the system is seeing an asset in the network and it has an anomalous name.

Figure 3:
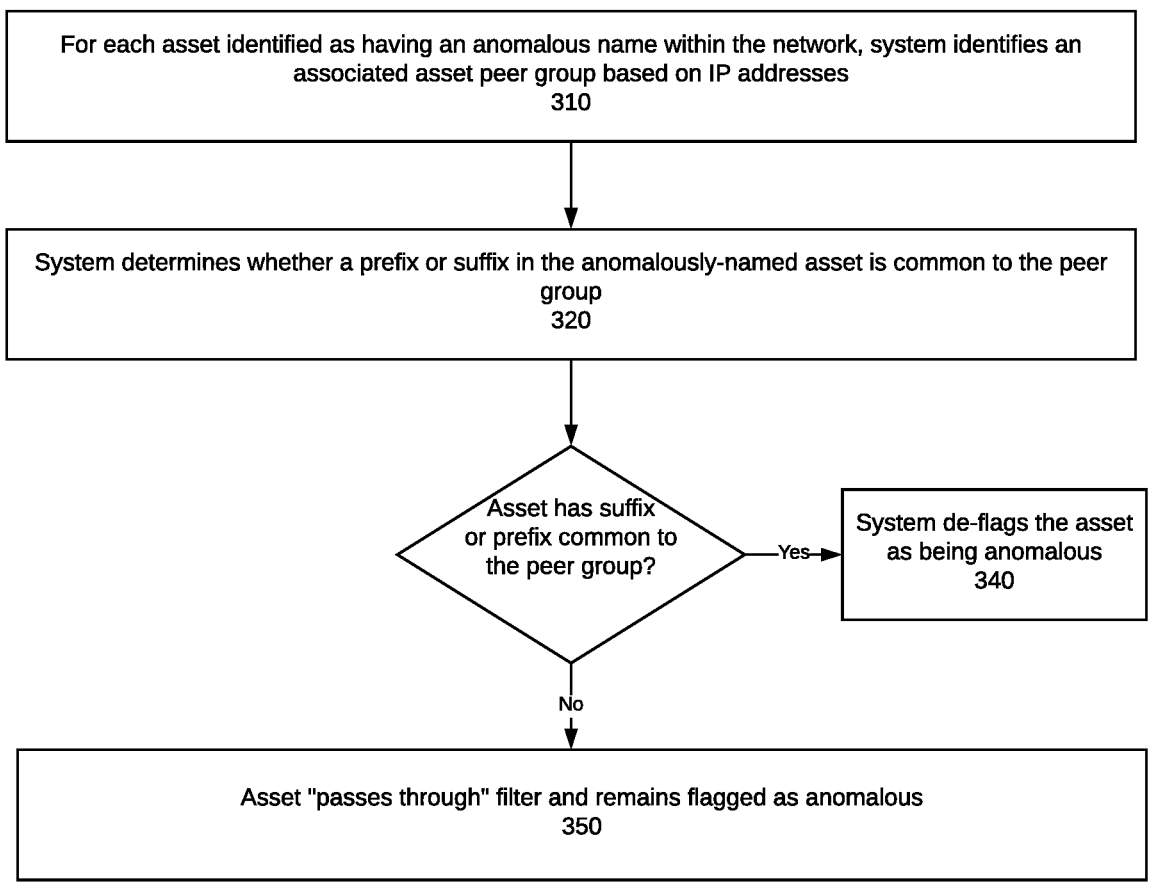
FIG. 3 is a flowchart that illustrates an example method for filtering out anomalously-named assets based on whether an asset's name conforms with the asset's peer group.

FIG. 3 illustrates a method for filtering out anomalously-named assets based on whether the asset is unusual within the asset's peer group. For each asset identified as having an anomalous name within the network, the system identifies an associated asset peer group using Internet Protocol (IP) addresses (step 310). For example, the system may cluster assets based on the first three blocks of the IP address to group assets into peer groups. The system then determines whether a prefix or suffix in the anomalously-named asset is common to the peer group (step 320). If so, the asset is de-flagged as being anomalous (step 330). Otherwise, the asset name "passes through" the filter and remains anomalous (step 340).

3. Training the RNN to Identify Patterns in Asset Names

The RNN is trained is to identify patterns in asset names by performing steps 110-170 with respect to a training data set and training the RNN to minimize the reconstruction errors. For example, the training data set may be extracting asset names from a window (e.g., 3 months) of domain controller logs in which user-to-asset authentications are recorded. One portion (e.g., 80%) of the training data set is used for training, and one portion (e.g., 20%) is used for parameter validation. To prepare the input data for RNN training, asset names may be fixed to a length n, where n is the length of the top 99% quantile of all asset names in the environment.

During training, the decoder receives the ground truth at the current time step as the input at the next time step in the teacher forcing method. At the output of the decoder, a densely connected layer is used to predict the sequential characters one by one. The loss function is specified as categorical cross-entropy since the prediction of each character is considered multi-class classification. This results in an RNN that learns the character distribution patterns of the names of all observed assets in the training data, effectively capturing the hidden naming structures followed by a majority of assets on the network.

Figure 4:
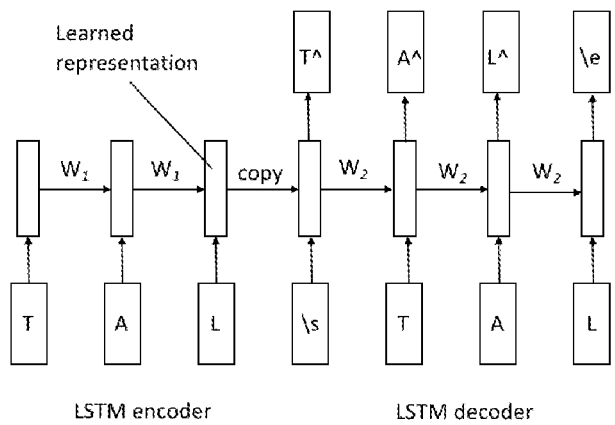
FIG. 4 is a diagram illustrating an example seq2seq LSTM.

FIG. 4 illustrates an example with an LSTM architecture for the RNN. A vector representative of a device called "TAL" is inputted into encoder, which generates a latent vector that is a learned representation of the input. For the corresponding output sequence, the symbols "/s" and "/n" are used as the start and end sequence characters. During training, the learned latent vector and the character "/s" is used to predict "T" in the decoder. The latent vector and the character "T" are used to predict "A", and so on. In one embodiment, the RNN implementation is written in Python using the Keras framework.

The methods described with respect to FIGS. 1-4 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for anomalous asset name detection in an IT computer network, the method comprising:
    creating a set of input vectors representative of an asset name in the IT network, each vector in the set corresponding to a character in the asset name;
    applying the set of input vectors to a recurrent neural network comprising an encoder and a decoder, wherein the recurrent neural network is trained to identify patterns in asset names in the IT network;
    using the encoder to compress the set of input vectors to a single latent vector that is representative of the asset name and that is generated based on patterns in asset names in the IT network learned by the recurrent neural network during training;
    applying the latent vector to the decoder as an initial state of the decoder to reconstruct the asset name one character at a time;
    receiving the reconstructed asset name;
    determining a degree of reconstruction error between the reconstructed asset name and the asset name;
    determining whether the degree of reconstruction error is above a threshold;
    in response to determining that the degree of reconstruction error is above a threshold, flagging the asset name as being anomalous;
    applying one or more filter criteria to assets flagged as having an anomalous name, wherein applying the one or more filter criteria comprises:
        identifying a peer asset group associated with an asset having a flagged asset name, wherein the peer group is identified based on IP addresses of assets,
        determining whether a prefix or suffix in the flagged asset name is common to the peer group, and
        in response to determining that the prefix or suffix of the flagged asset name is common to the peer group, concluding that the asset satisfies the filter criteria;
    filtering out assets that satisfy the filter criteria; and
    providing an indication of an elevated cybersecurity risk for at least a subset of remaining flagged assets that pass filtering.

2. The method of claim 1, wherein applying the filter criteria comprises:
    identifying a number of users using an asset having a flagged asset name; and
    in response to the number being above a threshold, concluding that the asset satisfies the filter criteria.

3. The method of claim 1, wherein providing an indication of an elevated cybersecurity risk comprises displaying flagged asset names that pass filtering in a user interface for administrative review.

4. The method of claim 1, wherein providing an indication of an elevated cybersecurity risk comprises increasing a risk score of a user session using a flagged asset that passed filtering.

5. The method of claim 1, wherein the set of input vectors is created using one-hot encoding.

6. The method of claim 1, wherein the recurrent neural network is a bidirectional recurrent neural network.

7. The method of claim 1, wherein the recurrent neural network is a seq2seq LSTM.

8. The method of claim 7, wherein the asset name is reconstructed one character at a time with teacher forcing method in which the set of input vectors, offset by one time step, is applied to the decoder.

9. A non-transitory computer-readable medium comprising a computer program, that, when executed by a computer system, enables the computer system to perform the following method for anomalous asset name detection in an IT computer network, the method comprising:
    creating a set of input vectors representative of an asset name in the IT network, each vector in the set corresponding to a character in the asset name;
    applying the set of input vectors to a recurrent neural network comprising an encoder and a decoder, wherein the recurrent neural network is trained to identify patterns in asset names in the IT network;
    using the encoder to compress the set of input vectors to a single latent vector that is representative of the asset name and that is generated based on patterns in asset names in the IT network learned by the recurrent neural network during training;

applying the latent vector to the decoder as an initial state of the decoder to reconstruct the asset name one character at a time;

receiving the reconstructed asset name;

determining a degree of reconstruction error between the reconstructed asset name and the asset name;

determining whether the degree of reconstruction error is above a threshold;

in response to determining that the degree of reconstruction error is above a threshold, flagging the asset name as being anomalous;

applying one or more filter criteria to assets flagged as having an anomalous name, wherein applying the one or more filter criteria comprises:

identifying a peer asset group associated with an asset having a flagged asset name, wherein the peer group is identified based on IP addresses of assets, determining whether a prefix or suffix in the flagged asset name is common to the peer group, and in response to determining that the prefix or suffix of the flagged asset name is common to the peer group, concluding that the asset satisfies the filter criteria;

filtering out assets that satisfy the filter criteria; and providing an indication of an elevated cybersecurity risk for at least a subset of remaining flagged assets that pass filtering.

10. The non-transitory computer-readable medium of claim 9, wherein applying the filter criteria comprises:

identifying a number of users using an asset having a flagged asset name; and in response to the number being above a threshold, concluding that the asset satisfies the filter criteria.

11. The non-transitory computer-readable medium of claim 9, wherein providing an indication of an elevated cybersecurity risk comprises displaying flagged asset names that pass filtering in a user interface for administrative review.

12. The non-transitory computer-readable medium of claim 9, wherein providing an indication of an elevated cybersecurity risk comprises increasing a risk score of a user session using a flagged asset that passed filtering.

13. The non-transitory computer-readable medium of claim 9, wherein the set of input vectors is created using one-hot encoding.

14. The non-transitory computer-readable medium of claim 9, wherein the recurrent neural network is a bidirectional recurrent neural network.

15. The non-transitory computer-readable medium of claim 9, wherein the recurrent neural network is a seq2seq LSTM.

16. The non-transitory computer-readable medium of claim 15, wherein the asset name is reconstructed one character at a time with teacher forcing method in which the set of input vectors, offset by one time step, is applied to the decoder.

17. A computer system for anomalous asset name detection in an IT computer network, the system comprising:

one or more processors;

one or more memory units coupled to the one or more processors, wherein the one or more memory units store instructions that, when executed by the one or more processors, cause the system to perform the operations of:

creating a set of input vectors representative of an asset name in the IT network, each vector in the set corresponding to a character in the asset name;

applying the set of input vectors to a recurrent neural network comprising an encoder and a decoder, wherein the recurrent neural network is trained to identify patterns in asset names in the IT network;

using the encoder to compress the set of input vectors to a single latent vector that is representative of the asset name and that is generated based on patterns in asset names in the IT network learned by the recurrent neural network during training;

applying the latent vector to the decoder as an initial state of the decoder to reconstruct the asset name one character at a time;

receiving the reconstructed asset name;

determining a degree of reconstruction error between the reconstructed asset name and the asset name;

determining whether the degree of reconstruction error is above a threshold;

in response to determining that the degree of reconstruction error is above a threshold, flagging the asset name as being anomalous;

applying one or more filter criteria to assets flagged as having an anomalous name, wherein applying the one or more filter criteria comprises:

identifying a peer asset group associated with an asset having a flagged asset name, wherein the peer group is identified based on IP addresses of assets, determining whether a prefix or suffix in the flagged asset name is common to the peer group, and in response to determining that the prefix or suffix of the flagged asset name is common to the peer group, concluding that the asset satisfies the filter criteria;

filtering out assets that satisfy the filter criteria; and providing an indication of an elevated cybersecurity risk for at least a subset of remaining flagged assets that pass filtering.

* * * * *